(12) United States Patent
Tanaka et al.

(10) Patent No.: US 12,180,376 B2
(45) Date of Patent: Dec. 31, 2024

(54) RADIATION-CURABLE INK JET COMPOSITION AND RECORDING METHOD

(71) Applicant: Seiko Epson Corporation, Tokyo (JP)

(72) Inventors: Kyohei Tanaka, Matsumoto (JP); Emi Takeuchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/676,280

(22) Filed: Feb. 21, 2022

(65) Prior Publication Data
US 2022/0267628 A1   Aug. 25, 2022

(30) Foreign Application Priority Data

Feb. 22, 2021   (JP) .................... 2021-026075

(51) Int. Cl.
| | | |
|---|---|---|
| C09D 11/32 | (2014.01) | |
| B41M 5/00 | (2006.01) | |
| B41M 7/00 | (2006.01) | |
| C09D 11/037 | (2014.01) | |
| C09D 11/101 | (2014.01) | |
| C09D 11/107 | (2014.01) | |
| C09D 11/322 | (2014.01) | |

(52) U.S. Cl.
CPC ......... *C09D 11/322* (2013.01); *B41M 5/0023* (2013.01); *B41M 7/0081* (2013.01); *C09D 11/037* (2013.01); *C09D 11/101* (2013.01); *C09D 11/107* (2013.01)

(58) Field of Classification Search
CPC ... C09D 11/037; C09D 11/101; C09D 11/107; C09D 11/322; C09D 11/38
See application file for complete search history.

(56) References Cited

U.S. PATENT DOCUMENTS

| | | | |
|---|---|---|---|
| 7,619,015 B2* | 11/2009 | Oyanagi | C09D 11/101 |
| | | | 427/466 |
| 11,230,647 B2* | 1/2022 | Nakashima | C08K 3/36 |
| 2020/0102464 A1 | 4/2020 | Tanaka et al. | |

FOREIGN PATENT DOCUMENTS

| | | | | |
|---|---|---|---|---|
| JP | 2011219648 A | * | 11/2011 | |
| JP | 2017-115105 A | | 6/2017 | |
| JP | 2019-019207 A | | 2/2019 | |
| JP | 2020-050764 A | | 4/2020 | |
| WO | WO-2018030027 A1 | * | 2/2018 | ........... B41J 2/01 |

* cited by examiner

*Primary Examiner* — Sanza L. McClendon
(74) *Attorney, Agent, or Firm* — Harness, Dickey & Pierce, P.L.C.

(57) ABSTRACT

A radiation-curable ink jet composition includes inorganic particles, a coloring material, and a polymerizable compound. The polymerizable compound contains a monofunctional monomer. A content of the monofunctional monomer is 80% by mass or greater with respect to a total amount of the polymerizable compound. A content of the inorganic particles is 10% by mass or less with respect to a total amount of the ink composition.

6 Claims, 1 Drawing Sheet

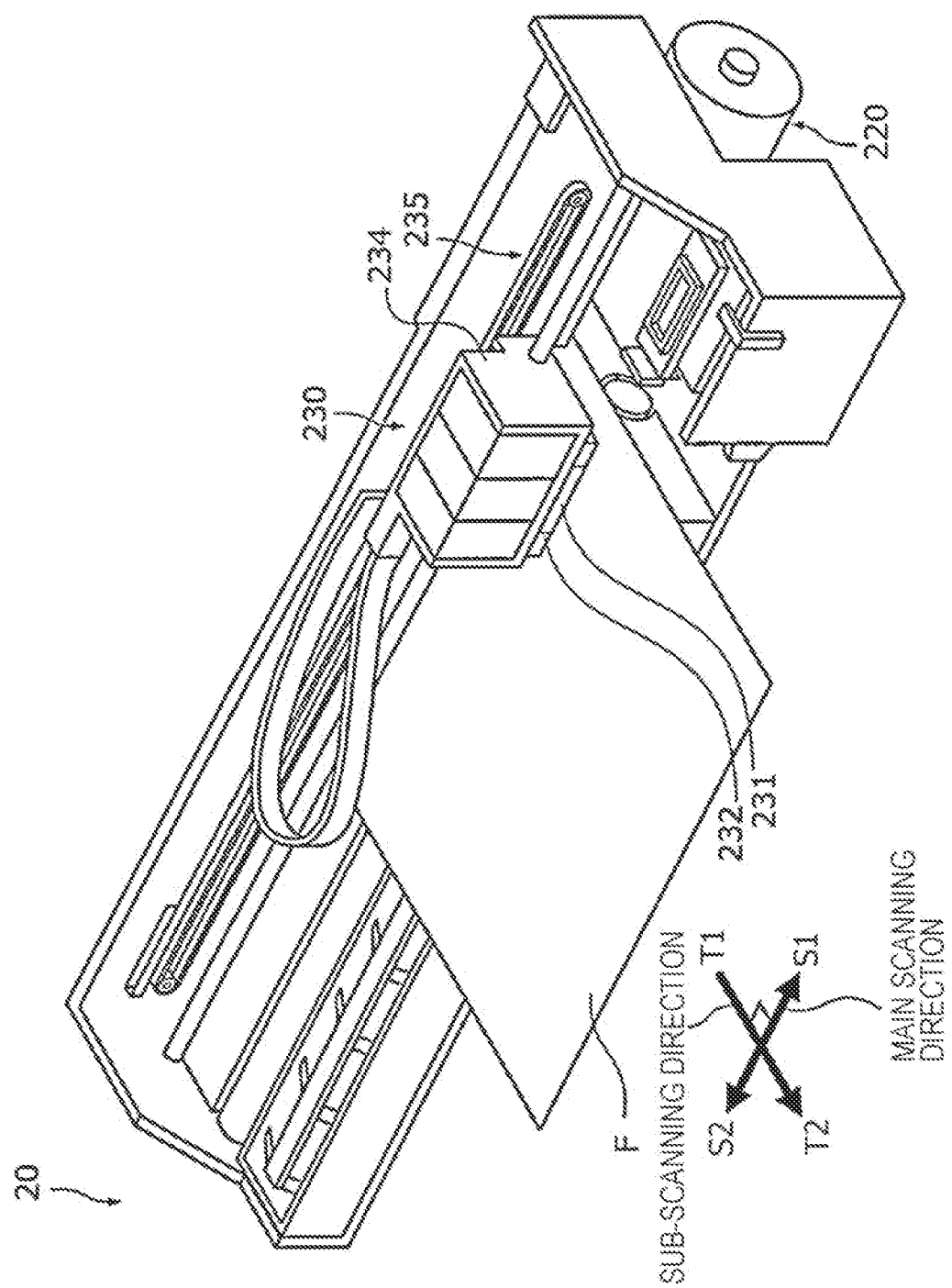

RADIATION-CURABLE INK JET COMPOSITION AND RECORDING METHOD

The present application is based on, and claims priority from JP Application Serial Number 2021-026075, filed Feb. 22, 2021, the disclosure of which is hereby incorporated by reference herein in its entirety.

BACKGROUND

1. Technical Field

The present disclosure relates to a radiation-curable ink jet composition and a recording method.

2. Related Art

An ink jet recording method has been used for printing business documents including characters and charts on plain paper or the like as a recording medium, and the frequency of use for such a purpose has increased. Since a high level of color developability or fastness (rub resistance, light resistance, ozone gas resistance, water resistance, or the like) of an image is required for such a purpose, an ink containing a pigment as a coloring material is used in many cases.

With the ink jet recording method, high-resolution images can be recorded using relatively simple devices, and thus the ink jet recording method has rapidly developed in various fields. Under these circumstances, various research has been performed, for example, on methods of performing recording on stretchable base materials. For example, JP-A-2017-115105 discloses, for the purpose of obtaining a laminated cured product with high stretchability and high color density in an image format formed using an ink jet recording method, an active energy ray-curable ink that contains a polymerizable compound containing 85% by mass or greater of a monofunctional monomer, a pigment, and a fluorine-based surfactant, in which the content of the monomer of the polymerizable compound and the content of the pigment are adjusted.

As described in JP-A-2017-115105, it is known that the adhesiveness of a cured coating film is improved by increasing the content of the monofunctional monomer with respect to the total amount of the polymerizable compound. However, an increase in only the proportion of the monofunctional monomer contained in the polymerizable compound may provide the coating film with insufficient adhesiveness depending on the kind or amount of the coloring material and depending on the combination of the coloring material and the material of the recording medium or the like.

SUMMARY

According to an aspect of the present disclosure, there is provided a radiation-curable ink jet composition including inorganic particles, a coloring material, and a polymerizable compound. The polymerizable compound contains a monofunctional monomer. A content of the monofunctional monomer is 80% by mass or greater with respect to a total amount of the polymerizable compound. A content of the inorganic particles is 10% by mass or less with respect to a total amount of the ink composition.

Further, according to another aspect of the present disclosure, there is provided a recording method including an ejecting step of ejecting, from an ink jet head, the radiation-curable ink jet composition described above to be adhered to a recording medium, and an irradiating step of irradiating with radiation the radiation-curable ink jet composition adhering to the recording medium.

BRIEF DESCRIPTION OF THE DRAWINGS

FIG. 1 is a perspective view illustrating a serial-type ink jet device according to the present embodiment.

DESCRIPTION OF EXEMPLARY EMBODIMENTS

Hereinafter, an embodiment of the present disclosure (hereinafter, referred to as the "present embodiment") is described in detail with reference to the accompanying drawing as necessary, but the present disclosure is not limited thereto, and various modifications can be made within a range not departing from the scope of the present disclosure. In the drawing, the same elements are denoted by the same reference numerals, and the description thereof is not repeated. Further, the positional relationship of up, down, left, and right is based on the positional relationship illustrated in the drawing unless otherwise specified. In addition, actual dimensional ratios are not limited to the ratios illustrated in the drawing.

In the present specification, the term "(meth)acryloyl" denotes at least one of acryloyl and methacryloyl corresponding to the acryloyl, the term "(meth)acrylate" denotes at least one of acrylate and methacrylate corresponding to the acrylate, and the term "(meth)acryl" denotes at least one of acryl and methacryl corresponding to the acryl.

1. Radiation-Curable Ink Jet Composition

A radiation-curable ink jet composition of the present embodiment (hereinafter, also simply referred to as an "ink composition") is an ink jet composition containing inorganic particles, a coloring material, and a polymerizable compound. The polymerizable compound contains a monofunctional monomer, the content of the monofunctional monomer is 80% by mass or greater with respect to the total amount of the polymerizable compound, and the content of the inorganic particles is 10% by mass or less with respect to the total amount of the ink composition.

In the related art, it is known that an increase in the proportion of a monofunctional monomer in a polymerizable compound leads to improved adhesiveness of an ink coating film to a recording medium. In the present embodiment, the adhesiveness can be further improved by using a predetermined amount of inorganic particles. In addition, the influence of the inorganic particles on the color reproducibility of the ink composition can be reduced by adjusting the amount of the inorganic particles to be used. Hereinafter, each component of the ink composition is described in detail.

In the present embodiment, "radiation-curable ink jet composition" refers to an ink jet composition that is cured by being irradiated with radiation. Examples of the radiation include ultraviolet rays, electron beams, infrared rays, visible light, and X-rays. Among these, ultraviolet rays are preferable as the radiation from the viewpoints that radiation sources are readily available and widely used and that materials suitable for being cured by irradiation with ultraviolet rays are also readily available and widely used.

1.1. Inorganic Particles

The inorganic particles are not particularly limited, and examples thereof include metal oxides such as alumina, silica, zirconia, and titania; metal hydroxides such as magnesium hydroxide, aluminum hydroxide, and calcium hydroxide; and metal nitrides such as silicon nitride, titanium nitride, and aluminum nitride.

Among these, metal oxides are preferable, alumina or silica is more preferable, and alumina is still more preferable. The adhesiveness between an ink coating film to be formed and a recording medium is likely to be further improved by using such inorganic particles.

In the present embodiment, the inorganic particles differ from the coloring material described below, and it is preferable that the content of the inorganic particles be smaller than the content of the coloring material as necessary. Specifically, the content of the inorganic particles is preferably 50 parts by mass or less and more preferably 40 parts by mass or less with respect to 100 parts by mass of the coloring material.

The content of the inorganic particles is 10% by mass or less, preferably 5.0% by mass or less, and more preferably 3.0% by mass or less with respect to the total amount of the ink composition. Further, the content of the inorganic particles is preferably 0.1% by mass or greater, more preferably 0.5% by mass or greater, and still more preferably 0.7% by mass or greater with respect to the total amount of the ink composition. The color reproducibility of the ink composition is further improved by setting the content of the inorganic particles to 10% by mass or less. Further, the adhesiveness between the ink coating film and the recording medium is likely to be further improved by setting the content of the inorganic particles to 0.1% by mass or greater.

1.2. Coloring Material

The coloring material is not particularly limited, and examples thereof include pigments and dyes. Among these, pigments are preferable. The color reproducibility is likely to be further improved by using such a coloring material.

The content of the coloring material is preferably in a range of 1.0% to 15% by mass, more preferably in a range of 2.0% to 10% by mass, and still more preferably in a range of 2.5% to 7.5% by mass with respect to the total amount of the ink composition. The adhesiveness and the color reproducibility are likely to be further improved by setting the content of the coloring material to be in the above-described ranges.

1.2.1. Pigment

The pigment is not particularly limited, and examples thereof include inorganic pigments and organic pigments. The pigment may be used alone or in a combination of two or more kinds thereof.

The inorganic pigment which can be used in the present embodiment is not particularly limited, and examples thereof include carbon blacks (C.I. (Colour Index Generic Name) Pigment Black 7) such as furnace black, lamp black, acetylene black, and channel black; iron oxides; and titanium oxides.

The organic pigment which can be used in the present embodiment is not particularly limited, and examples thereof include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, chelate dyes (such as basic dye-type chelates and acidic dye-type chelates), lake dyes (such as basic dye-type lakes and acidic dye-type lakes), nitro pigments, nitroso pigments, aniline black, and daylight fluorescent pigments.

Among these, colored pigments are preferable, and a black pigment is more preferable. Further, in the present embodiment, "colored pigments" refer to pigments other than a white pigment. Since addition of the inorganic particles is likely to affect the color reproducibility of such pigments, the present disclosure is particularly useful.

1.2.2. Dye

The dye is not particularly limited, and examples thereof include acidic dyes, direct dyes, reactive dyes, and basic dyes. The dye may be used alone or in a combination of two or more kinds thereof.

The dye which can be used in the present embodiment is not particularly limited, and examples thereof include C.I. Acid Yellows 17, 23, 42, 44, 79, and 142, C.I. Acid Reds 52, 80, 82, 249, 254, and 289, C.I. Acid Blues 9, 45, and 249, C.I. Acid Blacks 1, 2, 24, and 94, C.I. Food Blacks 1 and 2, C.I. Direct Yellows 1, 12, 24, 33, 50, 55, 58, 86, 132, 142, 144, and 173, C.I. Direct Reds 1, 4, 9, 80, 81, 225, and 227, C.I. Direct Blues 1, 2, 15, 71, 86, 87, 98, 165, 199, and 202, C.I. Direct Blacks 19, 38, 51, 71, 154, 168, 171, and 195, C.I. Reactive Reds 14, 32, 55, 79, and 249, and C.I. Reactive Blacks 3, 4, and 35.

1.3. Polymerizable Compound

The polymerizable compound contains a monofunctional monomer and may contain a polyfunctional monomer as necessary. Hereinafter, each monomer is described in detail.

1.3.1. Monofunctional Monomer

The monofunctional monomer is not particularly limited, and examples thereof include monofunctional monomers containing an alicyclic group, monofunctional monomers containing an aromatic group, and nitrogen-containing monofunctional monomers.

The content of the monofunctional monomer is 80% by mass or greater, preferably in a range of 83% to 95% by mass, and more preferably in a range of 85% to 90% by mass with respect to the total amount of the polymerizable compound. The adhesiveness between the ink coating film and the recording medium, the stretchability, and the curability are likely to be further improved by setting the content of the monofunctional monomer with respect to the total amount of the polymerizable compound to 80% by mass or greater.

The content of the monofunctional monomer is preferably in a range of 68% to 90% by mass, more preferably in a range of 70% to 85% by mass, and still more preferably in a range of 73% to 80% by mass with respect to the total amount of the ink composition. The adhesiveness between the ink coating film and the recording medium, the stretchability, and the curability are likely to be further improved by setting the content of the monofunctional monomer with respect to the total amount of the ink composition to be in the above-described ranges.

1.3.1.1. Monofunctional Monomer Containing Alicyclic Group

The monofunctional monomer containing an alicyclic group is not particularly limited, and examples thereof include monomers containing monocyclic hydrocarbon groups such as isobornyl acrylate, 4-tert-butylcyclohexyl acrylate (TBCHA), and 2-(meth)acrylic acid-1,4-dioxaspiro[4,5]dec-2-ylmethyl; monomers containing unsaturated polycyclic hydrocarbon groups such as dicyclopentenyl acrylate and dicyclopentenyloxyethyl acrylate; dicyclopentanyl acrylate; and isobornyl acrylate.

Among these, dicyclopentenyl (meth)acrylate (DCPA) or isobornyl acrylate (IBXA) is preferable. The adhesiveness and the rub resistance of the coating film to be obtained are likely to be further improved by using such a monomer.

The content of the monofunctional monomer containing an alicyclic group is preferably in a range of 15% to 45% by mass, more preferably in a range of 20% to 40% by mass, and still more preferably in a range of 25% to 35% by mass with respect to the total amount of the polymerizable compound. The adhesiveness between the ink coating film and the recording medium and the rub resistance are likely to be further improved by setting the content of the monofunctional monomer containing an alicyclic group with respect to the total amount of the polymerizable compound to be in the above-described ranges.

The content of the monofunctional monomer containing an alicyclic group is preferably in a range of 10% to 40% by mass, more preferably in a range of 15% to 35% by mass, and still more preferably in a range of 20% to 30% by mass with respect to the total amount of the ink composition. The adhesiveness between the ink coating film and the recording medium and the rub resistance are likely to be further improved by setting the content of the monofunctional monomer containing an alicyclic group with respect to the total amount of the ink composition to be in the above-described ranges.

1.3.1.2. Monofunctional Monomer Containing Aromatic Group

The monofunctional monomer containing an aromatic group is not particularly limited, and examples thereof include phenoxyethyl (meth)acrylate, benzyl (meth)acrylate, alkoxylated 2-phenoxyethyl (meth) acrylate, ethoxylated nonylphenyl (meth) acrylate, alkoxylated nonylphenyl (meth) acrylate, p-cumylphenol EO-modified (meth) acrylate, and 2-hydroxy-3-phenoxypropyl (meth) acrylate.

Among these, phenoxyethyl acrylate (PEA) is preferable. The solubility of a photopolymerization initiator and the curability of the ink composition are likely to be further improved by using such an aromatic group-containing monofunctional monomer. Particularly, when an acylphosphine oxide-based photopolymerization initiator or a thioxanthone-based photopolymerization initiator is used, the solubility thereof is likely to be good.

The content of the monofunctional monomer containing an aromatic group is preferably in a range of 25% to 50% by mass, more preferably in a range of 30% to 45% by mass, and still more preferably in a range of 35% to 40% by mass with respect to the total amount of the polymerizable compound. The adhesiveness between the ink coating film and the recording medium and the curability are likely to be further improved by setting the content of the aromatic group-containing monofunctional monomer with respect to the total amount of the polymerizable compound to be in the above-described ranges.

The content of the monofunctional monomer containing an aromatic group is preferably in a range of 15% to 45% by mass, more preferably in a range of 20% to 40% by mass, and still more preferably in a range of 25% to 35% by mass with respect to the total amount of the ink composition. The adhesiveness between the ink coating film and the recording medium and the curability are likely to be further improved by setting the content of the aromatic group-containing monofunctional monomer with respect to the total amount of the ink composition to be in the above-described ranges.

1.3.1.3. Nitrogen-Containing Monofunctional Monomer

The nitrogen-containing monofunctional monomer is not particularly limited, and examples thereof include nitrogen-containing monofunctional vinyl monomers such as N-vinylcaprolactam, N-vinylformamide, N-vinylcarbozole, N-vinylacetamide, and N-vinylpyrrolidone; nitrogen-containing monofunctional acrylate monomers such as acryloyl morpholine; and nitrogen-containing monofunctional acrylamide monomers such as (meth)acrylamide, N-hydroxymethyl (meth)acrylamide, diacetone acrylamide, N,N-dimethyl(meth)acrylamide, (meth)acrylamides such as a dimethylaminoethyl acrylate benzyl chloride quaternary salt, and the like.

Among these, a nitrogen-containing monofunctional acrylate monomer is preferable, and a monomer having a nitrogen-containing heterocyclic structure such as acryloyl morpholine (ACMO) is more preferable. The adhesiveness between the ink coating film and the recording medium, the rub resistance, and the flexibility are likely to be further improved by using such a nitrogen-containing monofunctional vinyl monomer.

The content of the nitrogen-containing monofunctional monomer is preferably in a range of 5% to 30% by mass, more preferably in a range of 10% to 25% by mass, and still more preferably in a range of 15% to 20% by mass with respect to the total amount of the polymerizable compound. The adhesiveness between the ink coating film and the recording medium, the rub resistance, and the flexibility are likely to be further improved by setting the content of the nitrogen-containing monofunctional monomer to be in the above-described ranges.

The content of the nitrogen-containing monofunctional monomer is preferably in a range of 2.5% to 27.5% by mass, more preferably in a range of 7.5% to 22.5% by mass, and still more preferably in a range of 12.5% to 17.5% by mass with respect to the total amount of the ink composition. The adhesiveness between the ink coating film and the recording medium, the rub resistance, and the flexibility are likely to be further improved by setting the content of the nitrogen-containing monofunctional monomer to be in the above-described ranges.

1.3.2. Polyfunctional Monomer

The polyfunctional monomer is not particularly limited, and examples thereof include vinyl ether group-containing (meth)acrylate and polyfunctional (meth)acrylate.

The content of the polyfunctional monomer is preferably in a range of 5.0% to 20% by mass, more preferably in a range of 5.0% to 17% by mass, and still more preferably in a range of 10% to 15% by mass with respect to the total amount of the polymerizable compound. The adhesiveness between the ink coating film and the recording medium, the stretchability, and the curability are likely to be further improved by setting the content of the polyfunctional monomer with respect to the total amount of the polymerizable compound to be in the above-described ranges.

The content of the polyfunctional monomer is preferably in a range of 3.0% to 25% by mass, more preferably in a range of 5.0% to 20% by mass, and still more preferably in a range of 10% to 15% by mass with respect to the total amount of the ink composition. The adhesiveness between the ink coating film and the recording medium, the stretchability, and the curability are likely to be further improved by setting the content of the polyfunctional monomer with respect to the total amount of the ink composition to be in the above-described ranges.

1.3.2.1. Vinyl Ether Group-Containing (Meth)Acrylate

The vinyl ether group-containing (meth)acrylate is not particularly limited, and examples thereof include a compound represented by Formula (1). The viscosity of the ink composition is likely to decrease and the ejecting stability and the curability are likely to be further improved by allowing the ink composition to contain such a vinyl ether group-containing (meth)acrylate.

$$H_2C=CR^1-CO-OR^2-O-CH=CH-R^3 \quad (1)$$

(In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

In Formula (1), examples of the divalent organic residue having 2 to 20 carbon atoms as $R^2$ include a linear, branched, or cyclic alkylene group having 2 to 20 carbon atoms which may be substituted, an alkylene group having 2 to 20 carbon atoms which has an oxygen atom via an ether bond and/or an ester bond in the structure and may be substituted, and a divalent aromatic group having 6 to 11 carbon atoms which may be substituted.

Among these, an alkylene group having 2 to 6 carbon atoms such as an ethylene group, an n-propylene group, an isopropylene group, or a butylene group and an alkylene group having 2 to 9 carbon atoms which has an oxygen atom via an ether bond in the structure, such as an oxyethylene group, an oxy n-propylene group, an oxyisopropylene group, or an oxybutylene group are preferable. Further, from the viewpoint that the viscosity of the ink composition can be further decreased and the curability of the ink composition is made to be improved, a compound having a glycol ether chain, in which $R^2$ represents an alkylene group having 2 to 9 carbon atoms which has an oxygen atom via an ether bond in the structure, such as an oxyethylene group, an oxy n-propylene group, an oxyisopropylene group, or an oxy-butylene group, is more preferable.

In Formula (1), as the monovalent organic residue having 1 to 11 carbon atoms as $R^3$, a linear, branched, or cyclic alkyl group having 1 to 10 carbon atoms which may be substituted or an aromatic group having 6 to 11 carbon atoms which may be substituted is suitable.

Among these, an alkyl group having 1 or 2 carbon atoms which is a methyl group or an ethyl group or an aromatic group having 6 to 8 carbon atoms such as a phenyl group or a benzyl group is suitably used.

When the above-described organic residues are groups which may be substituted, the substituents thereof are divided into groups having carbon atoms and groups having no carbon atoms. First, when the substituent is a group having carbon atoms, the number of carbon atoms is counted as the number of carbon atoms of the organic residue. The groups having carbon atoms are not limited to the following examples, and examples thereof include a carboxyl group and an alkoxy group. Next, the groups having no carbon atoms are not limited to the following examples, and examples thereof include a hydroxyl group and a halo group.

The compound represented by Formula (1) is not particularly limited, and specific examples thereof include 2-(2-vinyloxyethoxy)ethyl (meth)acrylate. Among the examples, 2-(2-vinyloxyethoxy)ethyl acrylate (VEEA) is preferable. The ejecting stability and the curability are likely to be further improved by allowing the ink composition to contain such a vinyl ether group-containing (meth) acrylate.

The content of the vinyl group-containing (meth)acrylate is preferably in a range of 5.0% to 20% by mass, more preferably in a range of 5.0% to 17% by mass, and still more preferably in a range of 10% to 15% by mass with respect to the total amount of the polymerizable compound. The adhesiveness between the ink coating film and the recording medium, the ejecting stability, and the curability are likely to be further improved by setting the content of the vinyl group-containing (meth)acrylate with respect to the total amount of the polymerizable compound to be in the above-described ranges.

The content of the vinyl group-containing (meth)acrylate is preferably in a range of 3.0% to 25% by mass, more preferably in a range of 5.0% to 20% by mass, and still more preferably in a range of 10% to 15% by mass with respect to the total amount of the ink composition. The adhesiveness between the ink coating film and the recording medium, the ejecting stability, and the curability are likely to be further improved by setting the content of the vinyl group-containing (meth)acrylate with respect to the total amount of the ink composition to be in the above-described ranges.

1.3.2.2. Polyfunctional (Meth)Acrylate

The polyfunctional (meth)acrylate is not particularly limited, and examples thereof include bifunctional (meth)acrylates such as dipropylene glycol di(meth)acrylate, diethylene glycol di(meth)acrylate, and triethylene glycol di(meth)acrylate; and trifunctional or higher polyfunctional (meth)acrylates such as trimethylolpropane tri(meth)acrylate, EO-modified trimethylolpropane tri(meth)acrylate, pentaerythritol tri(meth)acrylate, and pentaerythritol tetra (meth)acrylate.

1.4. Photopolymerization Initiator

The photopolymerization initiator is not particularly limited as long as an active species is generated by irradiation with radiation, and examples thereof include known photopolymerization initiators such as an acylphosphine oxide-based photopolymerization initiator, an alkylphenone-based photopolymerization initiator, a titanocene-based photopolymerization initiator, and a thioxanthone-based photopolymerization initiator. Among these, an acylphosphine oxide-based photopolymerization initiator is preferable. The curability of the ink composition is likely to be further improved, and particularly the curability obtained by performing the curing process with light of a UV-LED is likely to be further improved by using such a photopolymerization initiator. The photopolymerization initiator may be used alone or in a combination of two or more kinds thereof.

The acylphosphine oxide-based photopolymerization initiator is not particularly limited, and examples thereof include 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentyl phosphine oxide.

Examples of commercially available products of such an acylphosphine oxide-based photopolymerization initiator include IRGACURE 819 (bis(2,4,6-trimethylbenzoyl)-phenylphosphine oxide), IRGACURE 1800 (mixture of bis-(2,6-dimethoxybenzoyl)-2,4,4-trimethylpentyl phosphine oxide and 1-hydroxy-cyclohexyl-phenyl ketone at a mass ratio of 25:75), and IRGACURE TPO (2,4,6-trimethylbenzoyl diphenylphosphine oxide) (all manufactured by BASF SE).

The content of the photopolymerization initiator is preferably in a range of 3.0% to 15% by mass, more preferably in a range of 4.0% to 13.5% by mass, and still more preferably in a range of 5.0% to 12% by mass with respect to the total amount of the ink composition. The curability of the ink composition and the solubility of the photopolymerization initiator are likely to be further improved by setting the content of the photopolymerization initiator to be in the above-described ranges.

1.5. Polymerization Inhibitor

The polymerization inhibitor is not limited to the following examples, and examples thereof include p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and a hindered amine compound. The polymerization inhibitor may be used alone or in a combination of two or more kinds thereof.

The content of the polymerization inhibitor is preferably in a range of 0.01% to 1.0% by mass and more preferably in a range of 0.05% to 0.5% by mass with respect to the total amount of the ink composition.

1.6. Other Components

The radiation-curable ink jet composition according to the present embodiment may further contain additives such as a slipping agent and a dispersant as necessary.

1.6.1. Slipping Agent

As the slipping agent, a silicone-based surfactant is preferable, and polyester-modified silicone or polyether-modified silicone is more preferable. Examples of the polyester-modified silicone include BYK-347, BYK-348, BYK-UV3500, BYK-UV3510, and BYK-UV3530 (all manufactured by BYK Additives & Instruments GmbH), and examples of the polyether-modified silicone include BYK-3570 (manufactured by BYK Additives & Instruments GmbH). The slipping agent may be used alone or in a combination of two or more kinds thereof.

The content of the slipping agent is preferably in a range of 0.01% to 2.0% by mass and more preferably in a range of 0.05% to 1.0% by mass with respect to the total amount of the ink composition.

1.6.2. Dispersant

The dispersant is not particularly limited, and examples thereof include dispersants, such as a polymer dispersant, that are commonly used to prepare a pigment dispersion. Specific examples thereof include dispersants containing one or more of polyoxyalkylene polyalkylene polyamine, a vinyl-based polymer, a vinyl-based copolymer, an acrylic polymer, an acrylic copolymer, polyester, polyamide, polyimide, polyurethane, an amino-based polymer, a silicon-containing polymer, a sulfur-containing polymer, a fluorine-containing polymer, and an epoxy resin as main components. The dispersant may be used alone or in a combination of two or more kinds thereof.

Examples of commercially available products of the polymer dispersant include AJISPER Series (manufactured by Ajinomoto Fine-Techno Co., Ltd.), Solsperse Series (such as Solsperse 36000 available from Avecia, Inc. and Noveon, Inc.), DISPERBYK Series (manufactured by BYK Additives & Instruments GmbH), and DISPARLON Series (manufactured by Kusumoto Chemicals, Ltd.).

The content of the dispersant is preferably in a range of 0.1% to 2.0% by mass, more preferably in a range of 0.2% to 1.5% by mass, and still more preferably in a range of 0.3% to 1.2% by mass with respect to the total amount of the ink composition.

2. Recording Method

A recording method of the present embodiment includes an ejecting step of ejecting, from an ink jet head, the radiation-curable ink jet composition described above to be adhered to a recording medium and recording an image, and an irradiating step of irradiating with radiation the surface of the recording medium where the image has been recorded with the ink composition. Further, such an ejecting method is also referred to as an ink jet method.

2.1. Ejecting Step

In the ejecting step, the heated composition is ejected from the ink jet head and adhered to the recording medium. More specifically, a pressure generating unit is driven so that the composition filling a pressure generating chamber of the ink jet head is ejected from a nozzle.

Examples of the ink jet head used in the ejecting step include a line head that performs recording according to a line system and a serial head that performs recording according to a serial system.

In the line system using a line head, for example, an ink jet head having a width greater than or equal to the recording width of a recording medium is fixed to an ink jet device. An image is recorded on the recording medium by moving the recording medium in the sub-scanning direction (the longitudinal direction or the transport direction of the recording medium) and allowing ink droplets to be ejected from the nozzle of the ink jet head in association with the movement.

In the serial system using a serial head, for example, an ink jet head is mounted on a carriage that is movable in the width direction of a recording medium. An image can be recorded on the recording medium by moving the carriage in the main scanning direction (the lateral direction or the width direction of the recording medium) and allowing ink droplets to be ejected from a nozzle opening of the head in association with the movement.

2.2. Irradiating Step

In the irradiating step, the radiation-curable ink jet composition adhering to the recording medium is irradiated with radiation. When the radiation-curable ink jet composition is irradiated with radiation, the polymerization reaction of the monomer is started to cure the composition and a coating film is formed. Here, when a photopolymerization initiator is present, an active species (initiation species) such as a radical, an acid, or a base is generated, and the polymerization reaction of the monomer is promoted by the function of the initiation species. Further, when a photosensitizer is present, the ink composition absorbs radiation and enters an excited state, decomposition of the photopolymerization initiator is promoted due to the contact of the ink composition with the photopolymerization initiator, and the curing reaction can be further achieved.

Here, examples of the radiation include ultraviolet rays, infrared rays, visible light, and X-rays. The composition is irradiated with radiation by a radiation source provided downstream of the ink jet head. The radiation source is not particularly limited, and examples thereof include an ultraviolet light emitting diode. When such a radiation source is used, reduction in size of the device and cost reduction can be realized. Since an ultraviolet light emitting diode as an ultraviolet ray source is small, the diode can be installed in the ink jet device.

For example, an ultraviolet light emitting diode can be installed on the carriage (at both ends in the width direction of the medium and/or the side in the transport direction of the medium) where the ink jet head that ejects the radiation-curable ink jet composition is mounted. Further, curing with low energy at a high speed can be realized due to the composition of the radiation-curable ink jet composition described above.

3. Ink Jet Device

The ink jet device of the present embodiment includes an ink jet head including a nozzle that ejects the composition and a pressure chamber to which the composition is supplied, and a radiation source applying radiation to the composition, and the above-described radiation-curable ink jet composition is used as the composition.

FIG. 1 illustrates a perspective view of a serial printer as an example of an ink jet device. As illustrated in FIG. 1, a serial printer 20 includes a transport unit 220 and a recording unit 230. The transport unit 220 transports a recording medium F fed to the serial printer to the recording unit 230 and discharges the recording medium after recording to the outside of the serial printer. Specifically, the transport unit 220 has feeding rollers and transports the sent recording medium F in a sub-scanning direction T1.

Further, the recording unit 230 includes an ink jet head 231 that ejects the radiation-curable ink jet composition to the recording medium F sent from the transport unit 220, a radiation source 232 that irradiates the adhering radiation-curable ink jet composition with radiation, a carriage 234 on which these units are mounted, and a carriage movement mechanism 235 that moves the carriage 234 in main scanning directions S1 and S2 of the recording medium F.

FIG. 1 illustrates an aspect in which the radiation source is mounted on the carriage, but the present disclosure is not limited thereto, and the printer may have a radiation source that is not mounted on the carriage.

Further, the above-described ink jet device may be a serial-type printer or a line-type printer.

4. Recorded Material

A recorded material of the present embodiment is a material that is obtained by the radiation-curable ink jet composition being adhered to the recording medium and curing the composition. When the composition has good adhesiveness, occurrence of cracking or chipping of the coating film when post-processing such as cutting or bending is performed can be reduced. Therefore, the recorded material of the present embodiment can be suitably used for applications for signage and the like.

The material of the recording medium is not particularly limited, and examples thereof include plastics such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinyl acetal and such plastics having surfaces that have been processed, glass, paper, metals, and wood.

EXAMPLES

Hereinafter, the present disclosure is described in more detail based on examples and comparative examples. The present disclosure is not limited to the following examples.

1. Preparation of Radiation-Curable Ink Jet Composition

First, a part of a coloring material, a dispersant, and each monomer was weighed and added to a tank for pigment dispersion, a ceramic bead mill having a diameter of 1 mm was added to the tank, and the mixture was stirred, thereby obtaining a pigment dispersion in which the coloring material had been dispersed in the monomer. Next, the remaining monomer, the polymerization initiator, and the polymerization inhibitor were added to a tank for a mixture which was a stainless steel container so that the composition listed in Table 1 was obtained, the mixture was mixed and stirred so as to be completely dissolved, the pigment dispersion obtained in the above-described manner was poured into the mixture, and the solution was further mixed and stirred at room temperature for 1 hour and filtered through a membrane filter having a pore diameter of 5 μm, thereby obtaining radiation-curable ink jet compositions of respective examples. The numerical values of components shown in examples of the table are denoted in units of % by mass.

The abbreviations and the components of the products listed in Table 1 are as follows.

<Monofunctional Monomer>

IBXA (manufactured by Osaka Organic Chemical Industry Ltd., isobornyl acrylate)

PEA (trade name, "VISCOAT #192", manufactured by Osaka Organic Chemical Industry Ltd., phenoxyethyl (meth)acrylate)

ACMO (manufactured by KJ Chemicals Corporation, acryloyl morpholine)

<Polyfunctional Monomer>

VEEA (manufactured by Nippon Shokubai Co., Ltd., 2-(2-vinyloxyethoxy) ethyl acrylate)

<Polymerization Initiator>

819 (trade name, "IRGACURE 819", manufactured by BASF SE, bis(2,4,6-trimethylbenzoyl)-phenylphosphine oxide)

TPO (trade name, "IRGACURE TPO", manufactured by BASF SE, 2,4,6-trimethylbenzoyl diphenyl phosphine oxide)

<Polymerization Inhibitor>

MEHQ (trade name, "p-methoxyphenol", manufactured by Kanto Chemical Co., Inc., hydroquinone monomethyl ether)

<Slipping Agent>

BYK-UV3500 (manufactured by BYK Additives & Instruments GmbH, polyether-modified polydimethylsiloxane containing acryloyl group)

<Inorganic Particles>

Silica particles (trade name, "QSG-10", manufactured by Shin-Etsu chemical Co., Ltd., silica nanoparticles, average particle diameter of 15 nm)

Alumina particles (trade name, "1330DL", manufactured by Corefront Corporation, alumina nanoparticles, average particle diameter of 20 nm)

<Coloring Material>

Carbon black (product name, BONJET BLACK CW-1, manufactured by Orient Chemical Industries Co., Ltd.)

Pigment Blue 15:3 (trade name, "C.I. Pigment Blue 15:3", manufactured by DIC Corporation, Phthalocyanine Blue)

<Dispersant>

Solsperse 36000 (manufactured by Lubrizol Corporation, polymer dispersant)

In Table 1, the "proportion of monofunctional monomer" denotes the content of the monofunctional monomer with respect to the total amount of the polymerizable compound.

2. Evaluation Method 2.1. Evaluation of Adhesiveness

A polyvinyl chloride film was coated with each radiation-curable ink jet composition by using a bar coater such that the coating thickness reached 10 μm, and irradiated with ultraviolet rays such that the integrated energy had an irradiation intensity of 200 mJ/cm$^2$. Here, an LED having a peak wavelength of 395 nm was used as the light source. The obtained coating film was evaluated by performing a cross-cut test in conformity with JIS K 5600-5-6.

More specifically, a blade of a cutting tool was applied perpendicularly to the coating film, and a grid of 10×10 cells was made such that the distance between cuts reached 1 mm. Transparent adhesive tape (width 25 mm) having a length of approximately 75 mm was attached to the grid, and the tape was sufficiently rubbed with a finger such that the cured film was seen through the tape. Next, within 5 minutes after the tape had been attached, the tape was reliably peeled from the cured film at an angle of close to 60° in 0.5 to 1.0 seconds, and the state of the grid was visually observed. The evaluation criteria are as follows.

(Evaluation Criteria)

A: Peeling of the cured film was observed in less than 10% of the grid.

B: Peeling of the cured film was observed in 10% or greater and less than 35% of the grid.

C: Peeling of the cured film was observed in 35% or greater of the grid.

2.2. Evaluation of Color Reproducibility

The L* value ($L^*_1$) of the coating film obtained in the test of the adhesiveness (rub resistance) was measured using a colorimeter (trade name, "Gretag Macbeth Spectrolino", manufactured by X-Rite Inc.). Similarly, an ink containing no inorganic particles in each of the radiation-curable ink jet compositions was separately prepared, and the L* value ($L^*_2$) thereof was measured. A difference between $L^*_1$ and $L^*_2$ was acquired for each ink, and the color reproducibility was evaluated in accordance with the following criteria.

(Evaluation Criteria)

A: The difference between L*1 and L*2 was less than 3.

B: The difference between L*1 and L*2 was 3 or greater and less than 5.

C: The difference between L*1 and L*2 was 5 or greater.

TABLE 1

|  |  |  | Example 1 | Example 2 | Example 3 | Example 4 | Example 5 | Comparative Example 1 | Comparative Example 2 | Comparative Example 3 |
|---|---|---|---|---|---|---|---|---|---|---|
|  |  | Type |  |  |  |  |  |  |  |  |
| Monomer | Monofunctional | IBXA | 27.0 | 27.0 | 27.0 | 24.0 | 27.0 | 27.0 | 21.0 | 21.0 |
|  |  | PEA | 32.3 | 32.8 | 32.3 | 30.3 | 32.3 | 33.3 | 27.3 | 20.3 |
|  |  | ACMO | 15.0 | 15.0 | 15.0 | 15.0 | 15.0 | 15.0 | 15.0 | 15.0 |
|  | Polyfunctional | VEEA | 12.0 | 12.0 | 12.0 | 12.0 | 12.0 | 12.0 | 12.0 | 30.0 |
| Initiator |  | 819 | 2.5 | 2.5 | 2.5 | 2.5 | 2.5 | 2.5 | 2.5 | 2.5 |
|  |  | TPO | 5.5 | 5.5 | 5.5 | 5.5 | 5.5 | 5.5 | 5.5 | 5.5 |
| Polymerization inhibitor |  | MEHQ | 0.2 | 0.2 | 0.2 | 0.2 | 0.2 | 0.2 | 0.2 | 0.2 |
| Slipping agent |  | BYK UV3500 | 0.5 | 0.5 | 0.5 | 0.5 | 0.5 | 0.5 | 0.5 | 0.5 |
| Inorganic particles |  | Silica |  |  | 1.0 |  |  |  |  |  |
|  |  | Alumina | 1.0 | 0.5 |  | 6.0 | 1.0 |  | 12.0 | 1.0 |
| Coloring material |  | Carbon black | 3.0 | 3.0 | 3.0 | 3.0 |  | 3.0 | 3.0 | 3.0 |
|  |  | PB15:3 |  |  |  |  | 3.0 |  |  |  |
| Dispersant |  | Solsperse 36000 | 1.0 | 1.0 | 1.0 | 1.0 | 1.0 | 1.0 | 1.0 | 1.0 |
| Proportion of monofunctional monomer (%) |  |  | 86.1 | 86.2 | 86.1 | 85.2 | 86.1 | 86.3 | 84.1 | 65.2 |
| Total amount |  |  | 100.0 | 100.0 | 100.0 | 100.0 | 100.0 | 100.0 | 100.0 | 100.0 |
| Evaluation of coating film |  | Adhesiveness | A | B | B | A | A | C | A | C |
|  |  | Color reproducibility | A | A | A | B | A | A | C | A |

3. Evaluation Results

Table 1 shows the compositions of the radiation-curable ink jet compositions used in the examples and the evaluation results. Based on comparisons between the examples and Comparative Example 1, it was found that the adhesiveness is improved when the ink jet compositions contain inorganic particles. Further, based on comparisons between the examples and Comparative Examples 2 and 3, it was found that both the adhesiveness and the color reproducibility are excellent when the content of the monofunctional monomer is set to 80% by mass or greater with respect to the total amount of the polymerizable compound and the content of the inorganic particles is set to 10% by mass or less with respect to the total amount of the ink composition.

What is claimed is:

1. A radiation-curable ink jet composition comprising:
   inorganic particles;
   a coloring material; and
   a polymerizable compound,
   wherein the polymerizable compound contains a monofunctional monomer,
   a content of the monofunctional monomer is 80% by mass or greater with respect to a total amount of the polymerizable compound,
   a content of the inorganic particles is 10% by mass or less with respect to a total amount of the ink composition,
   the monofunctional monomer contains a monofunctional monomer having an alicyclic group, and a content of the monofunctional monomer having the alicyclic group is in a range of 15% to 35% relative to a total amount of the polymerizable compound,
   the polymerizable compound contains a polyfunctional monomer, and
   the polyfunctional monomer contains a vinyl group-containing (meth) acrylate represented by Formula (1):

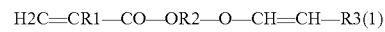

$$H_2C=CR_1-CO-OR_2-O-CH=CH-R_3 \quad (1)$$

wherein in the formula (1), R1 represents a hydrogen atom or a methyl group, R2 represents a divalent organic residue having 2 to 20 carbon atoms, and R3 represents a hydrogen atom or a monovalent organic residue having 1 to 11 carbon atoms.

2. The radiation-curable ink jet composition according to claim 1, wherein
   the inorganic particles contain alumina.

3. The radiation-curable ink jet composition according to claim 1, wherein
   the coloring material is a pigment.

4. The radiation-curable ink jet composition according to claim 3, wherein
   the pigment is a colored pigment.

5. The radiation-curable ink jet composition according to claim 1, wherein
   the content of the inorganic particles is 5.0% by mass or less with respect to the total amount of the ink composition.

6. A recording method comprising:
   an ejecting step of ejecting, from an ink jet head, the radiation-curable ink jet composition according to claim 1 to be adhered to a recording medium; and
   an irradiating step of irradiating with radiation the radiation-curable ink jet composition adhering to the recording medium.

* * * * *